July 7, 1970

C. F. AULT 3,519,929

ARRANGEMENT FOR COMPARING TWO FREQUENCIES BY ALTERNATE
COMPARISON WITH A CONTROLLABLE LOCAL FREQUENCY

Original Filed April 6, 1965

INVENTOR
C. F. AULT
BY *L. E. Snedeker*
ATTORNEY

United States Patent Office 3,519,929
Patented July 7, 1970

3,519,929
ARRANGEMENT FOR COMPARING TWO FREQUENCIES BY ALTERNATE COMPARISON WITH A CONTROLLABLE LOCAL FREQUENCY
Cyrus F. Ault, Lincroft, N.J., assignor to Bell Telephone Laboratories, Incorporated, New York, N.Y., a corporation of New York
Continuation of application Ser. No. 446,041, Apr. 6, 1965. This application Aug. 4, 1967, Ser. No. 658,575
Int. Cl. G01r 23/00
U.S. Cl. 324—79                    4 Claims

ABSTRACT OF THE DISCLOSURE

The frequency of a controllable oscillator is adjusted via a phase discriminator alternately between the respective frequencies of two signal sources to derive a representation of the magnitude and sense of the difference between the frequencies of the two signal sources.

---

This application is a continuation of application Ser. No. 446,041, filed Apr. 6, 1965.

This invention relates to frequency comparison arrangements and it has as a general object thereof the provision of a simple, compact, and economical arrangement for rapidly deriving an accurate comparison of two frequencies.

Many applications exist wherein it is necessary or desirable to derive a comparison between two or more frequencies. One such application is in Doppler radar systems, the transmitted signal frequency being compared with the returning or received signal frequency to determine the velocity and direction of movement of an object such as a satellite. Other applications of increasingly frequent occurrence involve arrangements for comparing and synchronizing the frequency of operation of a plurality of data handling, data storing, or data processing systems.

A number of frequency comparison arrangements have been proposed heretofore each of which has suffered from one or more shortcomings. For example, analog frequency comparison arrangements, such as capacitive charge and discharge circuits, though relatively simple and inexpensive, have been found to yield an insufficient degree of accuracy for many applications. On the other hand, digital frequency comparison arrangements, such as those employing one or more counters for determining differences in frequencies via respective cycle counts or the like, are quite accurate but they are expensive and relatively slow in deriving a frequency comparison. Moreover, digital counting arrangements generally do not provide an indication of the sense of the frequency difference, necessitating the employment of additional circuitry for this purpose.

Another problem sometimes encountered in frequency comparison arrangements is that of drift where the comparison output appears in the form of a voltage level which must be directly coupled to the utilization circuitry. Desirably, the frequency comparison output should be available in a form permitting alternating current coupling to the utilization circuitry, thereby minimizing or eliminating any drift problems and thus improving the accuracy of the comparison.

Accordingly, an object of this invention is to provide an arrangement for rapidly and accurately deriving signals proportional to the difference in the output frequencies of two frequency sources.

A further object of this invention is to provide a simple frequency comparison arrangement for deriving signals representative of the magnitude and sense of the difference between two frequencies.

Another object of the invention is to provide a highly accurate frequency comparison arrangement which is free from drift problems.

In an illustrative embodiment of the present invention for comparing the output frequencies of a pair of frequency sources, the above and other objects are attained in accordance with a feature of the invention through the use of a comparator and switching circuitry interconnected therewith for alternately and periodically connecting the comparator to the individual frequency sources. A first signal waveform is derived when the comparator is connected to the first source having a magnitude proportional to the frequency of the first source; and a second signal waveform is derived when the comparator is connected to the second source having a magnitude proportional to the frequency of the second source. As the comparator output changes from the first signal level to the second signal level and vice versa, the changes developed in the output signal level, referred to herein as frequency difference signals, are proportional in magnitude and correct in sense to the difference in the frequencies of the first and second frequency sources. The frequency difference signals thus generated are provided in a form advantageously suited for alternating current coupling to utilization circuitry for the desired application, such as for synchronizing the frequencies of the two sources in a known manner.

In accordance with another feature of the present invention a continuous indication of the instantaneous differences between two frequencies is generated through the use of a pair of comparators and switching circuitry interconnected therewith. The switching circuitry directs each of the two frequencies to be compared alternately to the individual comparators in an interleaved fashion. Each of the frequencies to be compared, therefore, is connected at all times to one or the other of the two comparators. Thus, each comparator individually generates frequency difference signals corresponding to the difference between the two frequencies, which signals from each comparator are alternately directed by the switching circuitry in interleaved fashion to output circuitry. The output circuitry accordingly provides a continuous indication of the instantaneous differences between the two frequencies.

The above and other objects and features of the invention may be fully apprehended from the following detailed description considered in conjunction with the accompanying drawing in which.

Figure 1:
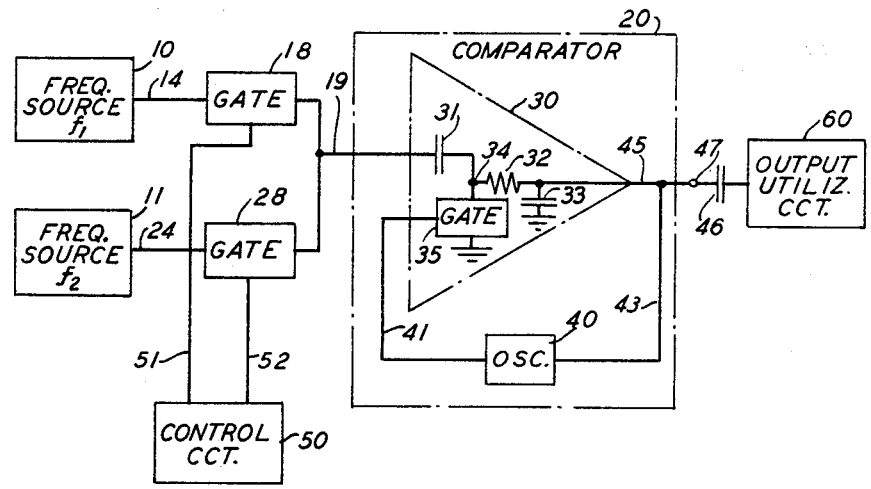
FIG. 1 shows an illustrative embodiment of a frequency comparison arrangement in accordance with the principles of the present invention.

In FIG. 1 of the drawing, two individual sources of frequency 10 and 11 depicted in block from provide output signal waveforms on leads 14 and 24 at respective distinct frequencies $f_1$ and $f_2$. Frequency sources 10 and 11 may comprise any known sources of frequency to be compared, depending upon the particular application in which the frequency comparison arrangement is employed. For example, if it is desired to compare and synchronize the operating frequencies of two systems such as a pair of storage mediums, frequency sources 10 and 11 correspond to the portions of the respective systems for providing representations of the respective system operating frequencies on leads 14 and 24. Similarly, if the arrangement of FIG. 1 were employed in a Doppler radar system, one of the frequency sources 10 and 11 would correspond to the transmitted signal and the other frequency source would corerspond to the returning or received signal which is to be compared in frequency and sense with the transmitted signal.

Comparison of the frequencies of frequency sources 10 and 11 is accomplished through the use of comparator 20 and switching circuitry comprising input gates 18 and 28 and control circuit 50. Comparator 20 illustratively includes a phase comparator, or phase discriminator 30, and a controllable frequency source such as oscillator 40. Phase discriminator 30 may be of any well-known construction for delivering an output voltage signal on comparator output lead 45 that is representative of the phase discrepancy between a signal on comparator input lead 19 and the output on lead 41 from oscillator 40. In the drawing, phase discriminator 30 is illustratively depicted as comprising gate 35, capacitors 31 and 33, and resistor 32. Gate 35 is normally closed, preventing passage of signals therethrough, and it is opened to connect point 34 to ground in response to a portion of each cycle of the output signal on lead 41 from oscillator 40. Thus the signal waveform on input lead 19 is sampled at a rate determined by the frequency of oscillator 40 to derive an output voltage signal on lead 45, as registered on capacitor 33, which is representative of the phase discrepancy between the signal on input lead 19 and the output for oscillator 40 on lead 41. The output voltage signal from phase discriminator 30 on lead 45 is applied over lead 43 to oscillator 40 in denegerative feedback fashion, thereby controlling oscillator 40 in such a way as to maintain whatever phase difference is required between the signals on comparator input lead 19 and on lead 41 to cause the output of phase discriminator 30 to synchronize or lock the frequency of oscillator 40 to the frequency of the signal comparator input lead 19.

Input gates 18 and 28 are normally closed to block the passage therethrough to comparator input lead 19 of signals on leads 14 and 24, respectively. Gates 18 and 28 are opened selectively in response to individual control signals from control circuit 50 on respective control leads 51 and 52. Control circuit 50 includes known circuitry, such as a multivibrator, for providing suitable control signals alternately on leads 51 and 52 to operate gates 18 and 28 at a rate substantially slower than the frequencies of the signals appearing on leads 14 and 24. For example, control circuit 50 may provide control signals on leads 51 and 52 to operate input gates 18 and 28 at a rate on the order of one-tenth or less that of the lower of the signal frequencies on leads 14 and 24.

Figure 2:
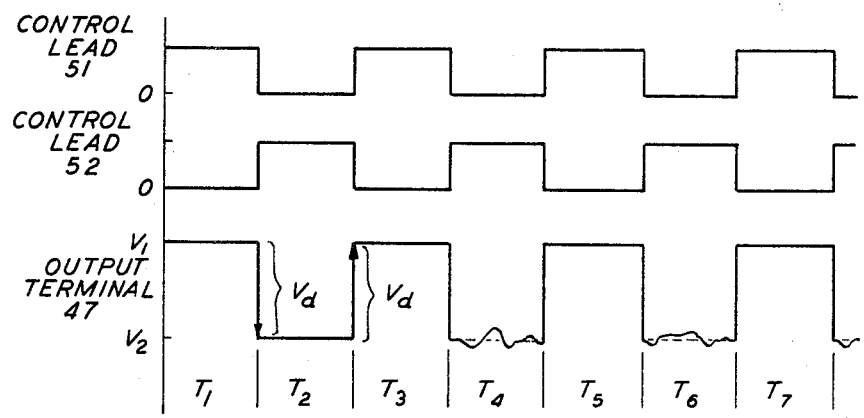
FIG. 2 depicts some illustrative waveforms useful in describing the embodiment of FIG. 1.

Assume now, for the purposes of describing the operation of the illustrative embodiment of the invention shown in FIG. 1, of the drawing, that gates 18 and 28 are initially closed to block passage therethrough of the frequency signals on leads 14 and 24 from frequency sources 10 and 11. Further assume for the purposes of illustration that the frequency $f_1$ of source 10 is greater than the frequency $f_2$ of source 11. When control circuit 50 is placed in operation, control signals are provided thereby alternately on each of control leads 51 and 52 as depicted in FIG. 2 of the drawing. The first such control signal from control circuit 50, assumed herein to be provided on lead 51 by way of example, opens input gate 18 for the duration of the control signal. This is shown as the period $T_1$ in FIG. 2. The signal on lead 14 representative of the frequency $f_1$ of source 10 is thus extended through gate 18 to comparator input lead 19 during the period $T_1$. It is assumed, as mentioned above, that the frequency of the control signals on lead 51 is such as to permit a number of cycles of the signal waveform on lead 14 to pass through gate 18 to comparator input lead 19 during period $T_1$.

At the same time, oscillator 40 applies a continuous train of output signals to lead 41 at an initial frequency which may be in the vicinity of the frequencies $f_1$ and $f_2$ of sources 10 and 11. Phase discriminator 30 in comparator 20, responsive to the appearance on input lead 19 of a signal representative of the frequency $f_1$ of source 10, delivers a first comparison signal on comparator output lead 45 which is representative of the phase discrepancy between the signal from source 10 on lead 19 and the output on lead 41 from oscillator 40. The first comparison signal on lead 45 is applied over lead 43 to oscillator 40 in degenerative feedback fashion, thereby controlling or varying in well-known manner the frequency of oscillator 40 in such a way as to synchronize or lock the frequency of oscillator 40 to the frequency of the signal on comparator input lead 19. Thus in the illustrative example herein, the first comparison signal on output lead 45 controls or varies the operation of oscillator 40 to provide output signals therefrom on lead 41 at the frequency $f_1$, the signal frequency appearing on lead 19 from frequency source 10. The first comparison signal on lead 45 appears at output terminal 47 and is shown as the voltage $V_1$ in FIG. 2. As will be apparent from the description hereinbelow, the particular magnitudes of the comparison signals on lead 45, such as the voltage $V_1$, are of no consequence in the present invention.

The second control signal from control circuit 50, upon cessation of the first control signal on lead 51, appears on lead 52 during the period $T_2$ in FIG. 2 and is applied to input gate 28. Responsive thereto, input gate 28 is opened to extend the signal wave on lead 24 representative of the frequency of frequency source 11 therethrough to comparator input lead 19. Phase discriminator 30 accordingly delivers a second comparison signal on comparator output lead 45 which is representative of the phase discrepancy between the signal on lead 19 from source 11 and the output on lead 41 from oscillator 40. Oscillator 40, it will be recalled, is operating at this point at the same frequency $f_1$ as frequency source 10, and therefore the change in the comparison signal on lead 45 corresponds to the difference between the frequencies $f_1$ and $f_2$ of sources 10 and 11. The second comparison signal on lead 45 is applied over lead 43 controlling the frequency of oscillator 40 in such a way as to lock the frequency thereof to the frequency of source 11. Thus in the illustrative example, the second comparison signal on lead 45, appearing at output terminal 47 and shown as the voltage $V_2$ in FIG. 2 of the drawing, controls the operation of oscillator 40 to provide output signals therefrom on lead 41 at the frequency $f_2$, the signal frequency appearing on lead 24 from source 11.

Similarly, during the period $T_3$ of the next control signal on lead 51, that is, the third control signal from control circuit 50, oscillator 40 is again locked to the frequency $f_1$ of source 10. At the beginning of period $T_3$ the frequency of oscillator 40 corresponds to the frequency $f_2$ of source 11, and therefore the change in the comparison signal voltage developed on output lead 45 to lock the frequency of oscillator 40 to the frequency $f_1$ of source 10 again corresponds to the magnitude and sense of the difference between the frequencies $f_1$ and $f_2$ of sources 10 and 11. Accordingly, it may be readily appreciated that as the comparator output signal level at output terminal 47 changes from the first comparison signal level $V_1$ to the second comparison signal level $V_2$, and vice versa, a signal shown as $V_d$ in FIG. 2 is generated, which is proportional in magnitude to the change in frequency of oscillator 40 between the frequency $f_1$ and the frequency $f_2$. This signal $V_d$ corresponds therefore to the magnitude of the difference in the frequencies of sources 10 and 11. Further, the signal $V_d$ contains the sense of the frequency difference between sources 10 and 11, as indicated by the arrows in FIG. 2, the sense of the changes in the comparison signal level corresponding to the sense of the difference in the frequencies of sources 10 and 11.

As long as control circuit 50 continues to provide control signals on leads 51 and 52, comparison of the frequencies of sources 10 and 11 continues to provide frequency difference signals at output terminal 47 in the manner just described. Such frequency difference signals at terminal 47 may be directed to appropriate utilization circuitry for use in accordance with the desired frequency comparison application. The utilization circuitry may, for example, include a detector operating under control of control circuit 50 in synchronism with input gates 18 and 28. Inasmuch as the comparator output signal at terminal 47 is not particular voltage levels but rather changes in level, the output signal may advantageously be capacitively coupled, such as via capacitor 46, to the output utilization circuit 60 to minimize drift problems.

It has been assumed during the above description that the frequencies on leads 14 and 24 are fairly constant or that any changes in the individual frequencies occur at rates relatively slow in comparison with the switching rate of gates 18 and 28. However, the frequency of one or both of the sources 10 and 11 may be changing or fluctuating more rapidly than the switching rate, such as shown for example for source 11 during the periods $T_4$ et seq. in FIG. 2. During the intervals that source 11 is connected to comparator 20 through gate 28, such as during periods $T_4$ and $T_6$, the output of comparator 20 at terminal 47 will follow the frequency changes of source 11. During the intervals that source 10 is connected to comparator 20, however, such as during periods $T_5$ and $T_7$ in FIG. 2, no indication of changes in frequency of source 11 will be available. To overcome this possible disadvantage of the embodiment of FIG. 1, the illustrative frequency comparator embodiment of FIG. 3 may be employed for providing a continuous indication of the difference in frequencies of sources 10 and 11.

Figure 3:
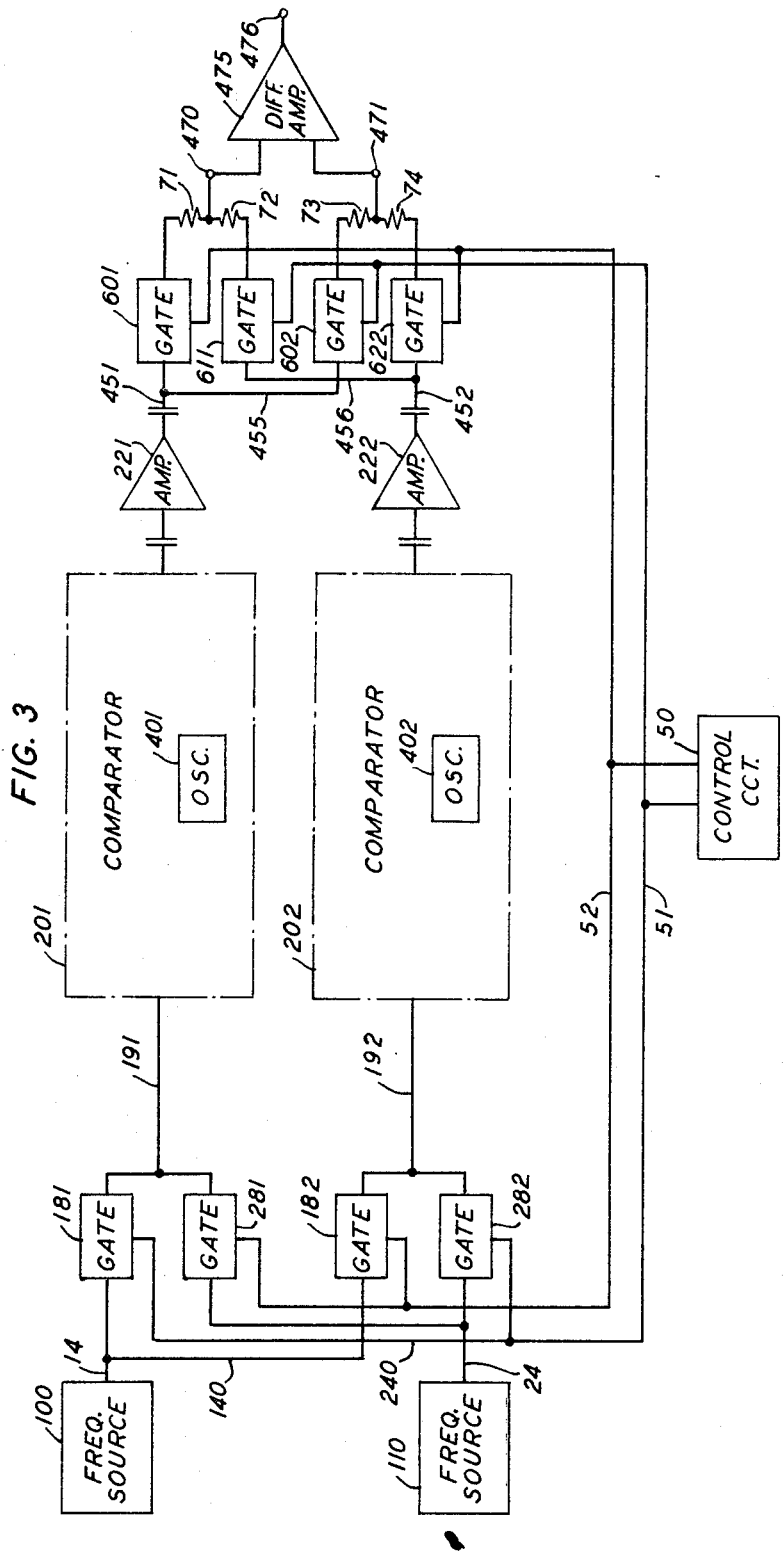
FIG. 3 shows another illustrative embodiment of a frequency comparison arrangement in accordance with the invention.

In the embodiment of FIG. 3 a pair of comparators 201 and 202 are employed, having individually controllable frequency sources such as respective oscillators 401 and 402. Each may be substantially similar in structure and operation to comparator 20 in FIG. 1. Input gates 181, 182, 281 and 282 and output gates 601, 602, 611 and 622 are similar to gates 18 and 28 in FIG. 1, each of these gates being individually opened in response to control signals from control circuit 50 on the appropriate ones of leads 51 and 52. Gates 181 and 281 are connected in common over lead 191 to comparator 201, the output of which is connected through amplifier 221 to output gates 601 and 602. Similarly, gates 182 and 282 are connected over lead 192 to comparator 202, the output of which is connected through amplifier 222 to output gates 611 and 622. The outputs of gates 601 and 611 are coupled through respective resistors 71 and 72 to output terminal 470, and the outputs of gates 602 and 622 are coupled through respective resistors 73 and 74 to output terminal 471.

Assuming again, for the purposes of describing the illustrative embodiment in FIG. 3, that the first control signal from control circuit 50 appears on lead 51, input gates 181 and 282 and output gates 602 and 611 are operated thereby. The operation of input gate 181 extends the frequency signal on lead 14 from frequency source 100 therethrough over comparator input lead 191 to comparator 201. Responsive thereto, comparator 201 develops a first comparison signal waveform on output lead 451 representative of the locking of oscillator 401 to the frequency of source 100. The first comparison signal from comparator 201 is amplified by amplifier 221 and is directed over leads 451 and 455 through output gate 602, operated by the control signal on lead 51, through resistor 73 to output terminal 471.

At the same time, the operation of input gate 282 by the control signal on lead 51 extends the frequency signal on lead 24 from frequency source 110 therethrough over comparator input lead 192 to comparator 202. Comparator 202 is operative in response thereto to develop a second comparison signal waveform on output lead 452 which is representative of the locking of oscillator 402 to the frequency of source 110. The second comparison signal is amplified by amplifier 222 and is directed over leads 452 and 456 through operated output gate 611 through resistor 72 to output terminal 470.

During the appearance of the next control signal from control circuit 50 on lead 52 input gates 182 and 281 and output gates 601 and 622 are operated. Therefore, the frequency signal from source 100 on lead 14 is directed over lead 140 through gate 182 and over input lead 192 to comparator 202. The comparison signal waveform developed by comparator 202 on output lead 452, representative now of the locking of oscillator 402 to the frequency of source 100, is directed through output gate 622 and resistor 74 to output terminal 471.

The frequency signal from source 110 on lead 24 is directed, during the appearance of a control signal on lead 52, over lead 240 to input gate 281 and therethrough over input lead 191 to comparator 201. The comparison signal waveform developed by comparator 201 on output lead 451, representative of the locking of oscillator 401 to the frequency of source 110, is directed through output gate 601 and resistor 71 to output terminal 470. The output signal waveform at terminal 470 therefore provides a continuous indication of changes in the frequency of source 110, and the output signal waveform at terminal 471 provides a continuous indication of changes in the frequency of source 100. Terminals 470 and 471 may be connected to respective inputs of difference amplifier 475 to provide at output 476 thereof a continuous representation of the differences between the signals at output terminals 470 and 471, and thus of the instantaneous differences between the frequencies of sources 100 and 110.

It is to be understood that the above-described arrangements are merely illustrative of the principles of the present invention. Numerous other arrangements may be devised by those skilled in the art without departing from the spirit and scope of the invention.

What is claimed is:

1. An arrangement for deriving a signal representation of differences between the frequencies of first and second input signals comprising first circuit means for generating output signals proportional in magnitude to the frequency of individual ones of said first and second input signals applied thereto, first and second input gating means respectively associated with individual ones of said first and second input signals, control circuit means for periodically operating said first and second input gating means individually in sequence to apply said respective associated first and second input signals to said first circuit means in an interleaved manner, output means, means for directing said first circuit means output signals to said output means, second circuit means for generating output signals proportional in magnitude to the frequency of individual ones of said first and second input signals applied thereto, third and fourth input gating means respectively associated with individual ones of said first and second input signals, said control circuit means periodically operating said third and fourth input gating means individually in sequence to apply said respective associated first and second input signals to said second circuit means in an interleaved manner such that when one of said first and second input signals is applied to said first circuit means the other of said input signals is applied to said second circuit means, and means for directing said second circuit means output signals to said output means.

2. An arrangement for comparing the frequencies of first and second input signals comprising, first circuit means for generating output signals proportional in magnitude to the frequency of individual ones of said first and second input signals applied thereto, first and second input gating means respectively associated with individual ones of said first and second input signals, control circuit means for periodically operating said first and second input gating means individually in sequence to apply said respective associated first and second input signals to said first circuit means in an interleaved manner, output means, second circuit means for generating output signals proportional in magnitude to the frequency of individual ones of said first and second input signals applied thereto, third and fourth input gating means respectively associated with individual ones of said first and second input signals, said control circuit means periodically operating said third and fourth input gating means individually in sequence to apply said respective associated first and second input signals to said second circuit means in an interleaved manner such that when one of said first and second input signals is applied to said first circuit means the other of said input signals is applied to said second circuit means, means for directing said first circuit means output signals to said output means including first and second output gating means individually operated by said control circuit means in synchronism, respectively, with said first and second input gating means, and means for directing said second circuit means output signals to said output means including third and fourth output gating means individually operated by said control circuit means in synchronism, respectively, with said fourth and third input gating means.

3. An arrangement in accordance with claim 2 wherein said output means comprises a first output terminal connected to said first and fourth output gating means for providing a continuous signal representation of variations in said first input signal frequency, and a second output terminal connected to said second and third output gating means for providing a continuous signal representation of variations in said second input signal frequency.

4. An arrangement in accordance with claim 3 wherein said output means further comprises a difference amplifier having first and second inputs connected to said first and second output terminals.

References Cited
UNITED STATES PATENTS

| | | |
|---|---|---|
| 2,556,226 | 6/1951 | Shadowitz et al. |
| 2,888,643 | 5/1959 | Summerhayes _____ 324—82 |
| 3,059,187 | 10/1962 | Jaffe. |
| 3,154,741 | 10/1964 | Attwood. |
| 3,207,995 | 9/1965 | Beer et al. |

ALFRED E. SMITH, Primary Examiner

U.S. Cl. X.R.

328—133